United States Patent [19]
Kutney et al.

[11] 3,946,830
[45] Mar. 30, 1976

[54] INLET NOISE DEFLECTOR

[75] Inventors: John T. Kutney, Cincinnati; Rodger B. Mishler, West Chester, both of Ohio

[73] Assignee: General Electric Company, Cincinnati, Ohio

[22] Filed: Sept. 6, 1974

[21] Appl. No.: 503,751

[52] U.S. Cl............ 181/33 HA; 137/15.1; 415/119
[51] Int. Cl.²............................................ E04B 1/99
[58] Field of Search ........ 181/33 H, 33 HA, 33 HB, 181/33 HC; 415/119; 239/127.3, 521, 523; 137/15.1

[56] References Cited
UNITED STATES PATENTS

| | | |
|---|---|---|
| 2,970,431 | 2/1961 | Harshman .......................... 137/15.1 |
| 3,027,710 | 4/1962 | Maytner ............................ 239/127.3 |
| 3,545,464 | 12/1970 | Brown ................................. 137/15.1 |

*Primary Examiner*—L. T. Hix
*Assistant Examiner*—Vit W. Miska
*Attorney, Agent, or Firm*—Derek P. Lawrence; Lee H. Sachs

[57] ABSTRACT

An inlet duct for use with gas turbine engines or the like is provided with an axially upstream projecting deflector means to reduce noise propagation emanating within said duct. The deflector member has an essentially double arcuate contour of the lip in the axial direction which improves noise attenuation and inlet total pressure recovery. The contour is provided with at least one point of curvature inflection.

11 Claims, 5 Drawing Figures

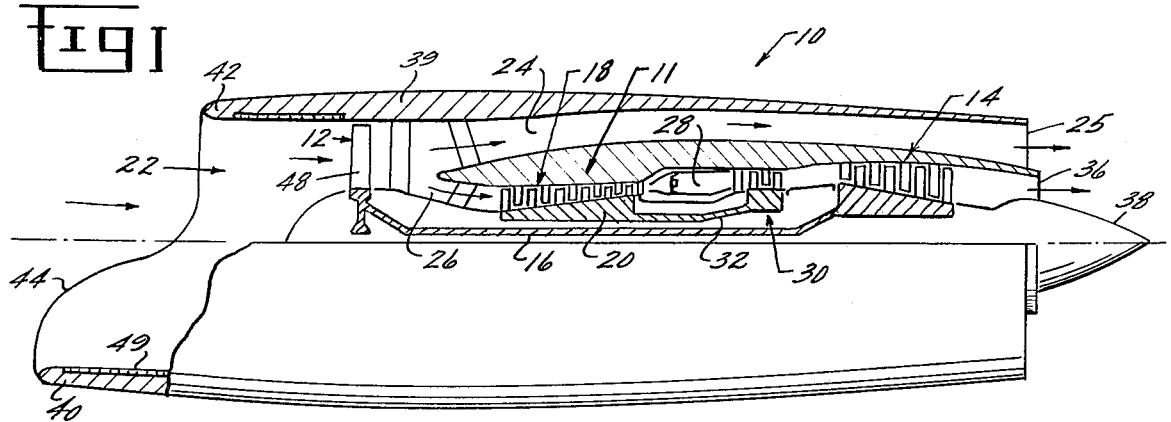
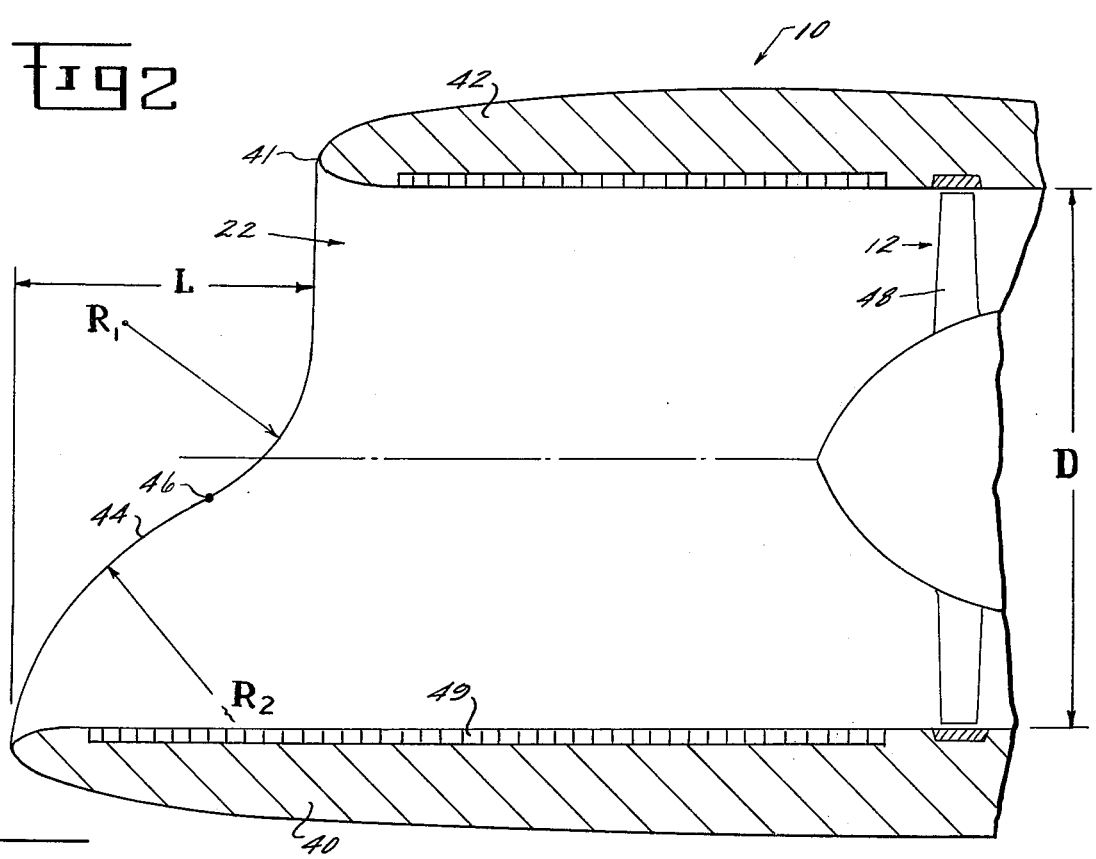
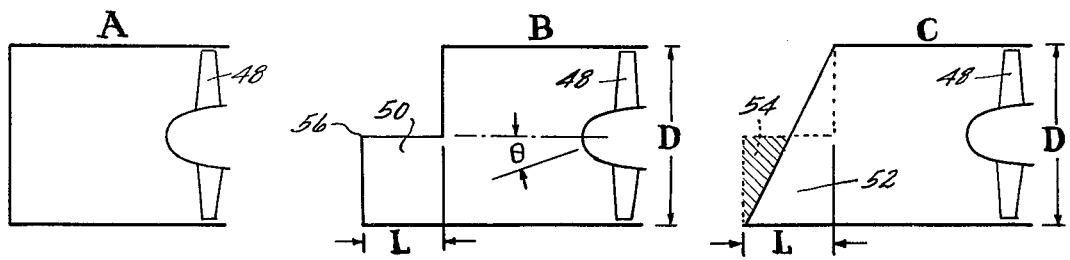
PRIOR ART

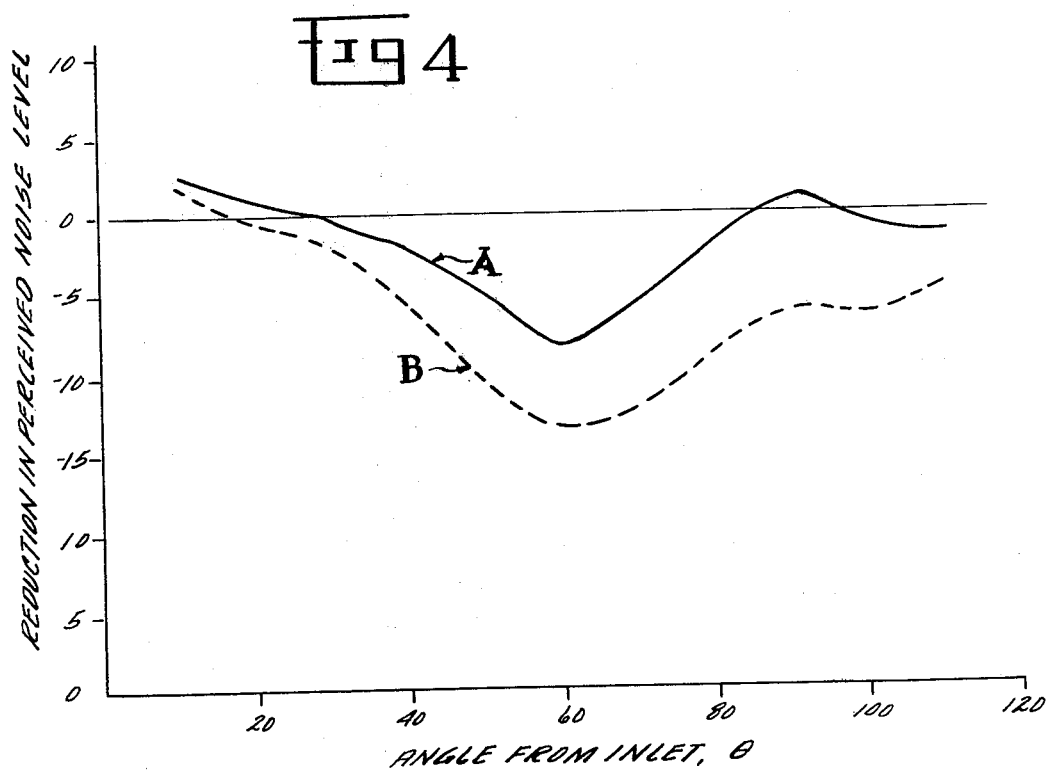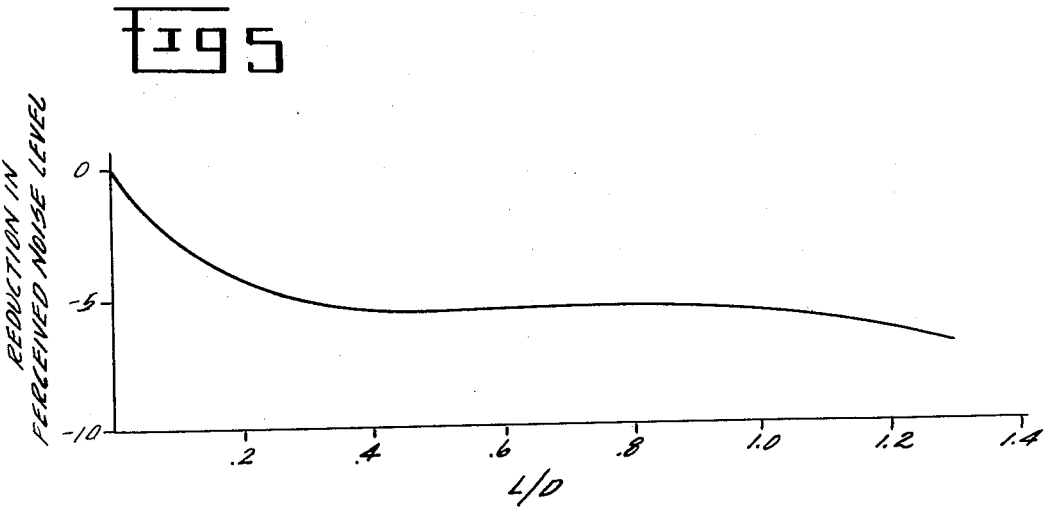

INLET NOISE DEFLECTOR

BACKGROUND OF THE INVENTION

In the present era of environmental awareness, the gas turbine engine designer, and particularly the designer of such engines for aircraft propulsion, is faced with the dilemma of reducing engine pollutants while sacrificing the minimum engine performance. One type of pollution which recently has received considerable attention is noise.

Gas turbine engine noise is generated from two primary sources. First, there is that associated with the viscous shearing of rapidly moving gases exhausted into the relatively quiescent surrounding atmosphere. In turbofan aircraft engines, such gases are emitted from the fan and core nozzles at the rear of the engine. Various approaches have been utilized to reduce this "shear" noise, most approaches incorporating mixers to comingle fan and exhaust gases with each other and with the surrounding environment.

The second source of noise, and the one to which the present invention is directed, is generated by the rotating turbomachinery itself. This results from the relative motion between the rapidly rotating blade rows and the interflowing gas stream. The noise is affected by such parameters as blade rotational speed, blade-to-blade spacing, blade geometry, and by the proximity of stationary hardware to such rotating blade rows, as in the case of an outlet guide vane arrangement. Another example of the latter condition occurs in typical multistage axial compressors where stationary blade rows are alternated with rotating blade rows. Some of the noise generated in this manner can be absorbed and suppressed by means of acoustic or sound absorbing paneling disposed about the periphery of the nacelle enclosing the rotating turbomachinery. Such sound absorbing material is well known in the art. However, because of the close proximity of the fan or compressor to the inlet frontal plane, and the lack of acoustic shielding in the forward direction, a significant percentage of noise propagates forward from the gas turbine inlet duct.

Prior attempts to solve this problem have concentrated on the application of sound absorbing material to the inlet duct inner wall. This does little to attenuate unreflected noise propagating in the axially forward direction. Additional benefits have been obtained by providing coaxial, circumferential rings of sound absorbent material within the inlet. However, such rings produce a loss of inlet total pressure and, therefore, bring about performance losses which remain throughout the engine operating envelope even when noise propagation presents no hazard or nuisance to inhabitants below.

Another concept incorporates an axially translating wedge-shaped scoop on the bottom of the inlet duct to selectively reduce the downward transmission of noise from the inlet. However, this configuration is inadequate for two reasons. First, it has been shown that an inlet incorporating such a scoop has a poor pressure recovery characteristic (i.e., it is inherently a high loss system). Secondly, and somewhat related to the foregoing problem is that the total pressure pattern is highly distorted, as for example in the plane of a gas turbine fan stage disposed within the duct. While the former characteristic results in degraded engine performance, the latter may, under certain conditions, cause excessive fan blade stresses and possible destruction of the rotating turbomachinery.

Yet another approach has been to extend axially forward the lower cylindrical half of the inlet duct. In side profile, this results in a stepped duct wall contour. Although the configuration tends to reduce noise level, it is aerodynamically undesirable from the inlet recovery and distortion aspects discussed hereinbefore.

The problem facing the gas turbine designer is, therefore, to provide a means for attenuating noise emanating from the duct without incurring overall performance penalties.

SUMMARY OF THE INVENTION

Accordingly, it is the primary object of this invention to reduce noise emanating from within a duct without sacrificing overall performance.

This, and other objects and advantages, will be more clearly understood from the following detailed description, the drawings and specific examples, all of which are intended to be typical of rather than in any way limiting the present invention.

Briefly stated, the above objective is attained by providing within a predetermined sector of the duct inlet an axially upstream protruding deflector. The profile of the transition between the extended deflector and the downstream inlet duct sector opposite the deflector is arcuate, having no sharp corners at the inlet lip. Further, the curvature thus imposed upon the inlet lip has a point of inflection, thereby causing the radius of curvature to change in sense during the transition.

While this invention will aid in inlet noise suppression, most significant is that it will accomplish this suppression without substantial performance degradation from that of an ideal inlet wherein the plane of the inlet is essentially normal to the inlet longitudinal axis.

Further, limits have been established for the length of the deflector and the radius of curvature of the transition within which maximum noise attenuation will result, and beyond which noise attenuation improvement is offset by increased duct length and weight.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given in connection with the accompanying drawings, in which:

FIG. 1 is a schematic representation of a gas turbine engine incorporating the subject invention;

FIG. 2 is an enlarged view of the inlet portion of FIG. 1 incorporating the subject invention;

FIG. 3 depicts schematically a plurality of prior art gas turbine inlets;

FIG. 4 is a plot depicting the reduction in perceived noise level of the present invention over that of prior state-of-the-art inlets as a function of angular position from the inlet; and FIG. 5 is a plot depicting the reduction in perceived noise level of the present invention as a function of length of the deflector and depicting optimum deflector length.

DESCRIPTION OF THE PREFERRED EMBODIMENT

Referring to the drawings wherein like numerals correspond to like elements throughout, reference is initially directed to FIG. 1 wherein an engine depicted generally at 10 embodying the present invention is diagrammatically shown. This engine may be considered as comprising generally a core engine 11, a fan assembly 12 and a fan turbine 14 which is interconnected to the fan assembly 12 by shaft 16. The core engine 11 includes an axial flow compressor 18 having a rotor 20. Air enters inlet assembly 22 and is initially compressed by fan assembly 12. A first portion of this compressed air enters the fan bypass duct 24 and subsequently discharges through a fan nozzle 25. A second portion of the compressed air enters inlet 26, is further compressed by the axial flow compressor 18 and then is discharged to a combustor 28 where fuel is burned to provide high energy combustion gases which drive a turbine 30. The turbine 30, in turn, drives the rotor 20 through a shaft 32 in the usual manner of a gas turbine engine. The hot gases of combustion then pass to and drive the fan turbine 14 which, in turn, drives the fan assembly 12. A propulsive force is thus obtained by the action of the fan assembly 12, discharging air from the fan bypass duct 24 through the fan nozzle 25 and by the discharge of combustion gases from a core engine nozzle 36 defined, in part, by plug 38.

The above description is typical of many present-day engines and is not meant to be limiting, as it will become readily apparent from the following description that the present invention is capable of application to any duct having noise emanating from within. It is not intended to be restricted to application in gas turbine engines. The above description of the engine depicted in FIG. 1 is, therefore, merely meant to be illustrative of one type of application.

Referring now to FIG. 2, the inlet assembly of FIG. 1 is shown to include an essentially cylindrical duct wall 39 having a lip 41. A deflector member 40 is disposed about a predetermined sector of the duct assembly and comprises an extension of lip 41 in the axially upstream direction. The rearward-most sector of the inlet lip is depicted at 42 and, although shown in FIG. 2 to be diametrically opposite the forward-most extension of deflector 40, it is contemplated that sector 42 and deflector 40 could be disposed in a variety of circumferential relationships with respect to each other. The lip of the deflector 40 is shown to be contoured as at 44 in the axial direction, having a generally double arcuate profile (i.e., a smooth curve having a point of inflection 46). The diameter of the inlet duct 22 is represented as D and the length of the deflector member 40 as L. A rotating stage of gas turbine fan blades 48 is disposed within the duct to pressurize the flow of air therethrough. Acoustic paneling 49 of the honey-comb type known in the art may be disposed upon the walls to enhance acoustic suppression.

FIGS. 3a, 3b, and 3c represent prior art inlets which have been adapted for gas turbine application. FIG. 3a depicts a typical ideal axisymmetric fixed lip inlet (hereinafter referred to as a conventional inlet) wherein the inlet frontal plane is essentially perpendicular to the duct longitudinal axis. FIGS. 3b and 3c depict attempts to extend the lower lip axially forward to shield noise in the downward direction. While the inlet of FIG. 3a could be extended forward to provide improved sound suppression, an extended 360° structure results in significant weight increases which are undesirable in aircraft applications. In such applications, it is most desirable to shield noise in the essentially downward 180° sector during aircraft approach or landing. It is desirable to maximize the shield area in the lower inlet quadrant to maximize noise attenuation in that direction since the human observer is on the ground.

Previously, the configuration of FIG. 3b was considered optimum for noise attenuation since for a given axially forward extension L of the lower half of the essentially cylindrical inlet duct 50, this would yield the maximum shielded area. Configuration 3b is inherently better than that of FIG. 3c with wedge-shaped deflector member 52 since the shielded area in the lower quadrant is substantially increased, the shaded area 54 of FIG. 3c representing the increased shielded area of inlet 3b over inlet 3c when superimposed. Each of the prior art configurations of FIG. 3, however, have been found to be deficient in either inlet total pressure recovery (the ratio of total pressure at the plane of the fan blades 48 to that of the free stream ahead of the fan) or to produce less sound attenuation than the present invention, or both. Unexpectedly, the duct inlet of FIG. 2 produces better sound attenuation than the inlet of FIG. 3b, heretofore thought to constitute an optimum deflector from acoustic considerations.

FIG. 4 depicts a graph showing reduction in perceived noise level of the inlet of the present invention and that of FIG. 3b with respect to a conventional inlet as a function of the angular position from the inlet. The characteristic of the deflector of FIG. 3b is denominated as curve A and that of the present invention as curve B. The angle $\theta$ is defined as that measured between the inlet duct longitudinal axis and a line constructed from the observer to the inlet duct noise source in a plane defined by the inlet duct longitudinal axis and the centerline of the deflector as shown in FIG. 3b. As is readily apparent, the present invention has superior sound suppression over the prior art inlet throughout the angular range of interest. This is attributed to the fact that the corner 56 of the deflector 50 (FIG. 3b) has been eliminated. This prior art corner is suspected of shedding a vortex of swirling air which impinges upon the fan and creates its own noise source. In essence, though the deflector of the present invention has a smaller projected area than the prior art deflector, it has improved sound suppression through elimination of vortices. This also results in a lighter inlet, which is of critical importance in aircraft gas turbine applications. Further, it has been found that due to the elimination of the sharp corners, the inlet pressure recovery of the present invention is superior to that of the prior art devices.

The subject invention, as tested, comprises a structure wherein the arcuate transition 44 of the axially forward deflector 40 consists of two tangent, essentially circular arcs of opposite senses, with radii of curvature of $R_1$ and $R_2$, FIG. 2. Though the value of the ratios $R_1/D$ and $R_2/D$ were essentially 0.4 and 0.6, respectively, it is contemplated that values of $R_1/D$ between essentially 0.3 and 0.5, and values of $R_2/D$ between 0.5 and 0.7 would yield acceptable performance. Similarly, a sinusoidal curvature could be employed.

Further, through parametric studies, Applicant discovered that for an L/D ratio greater than 0.4, no noise reduction occurred even though the deflector length was increased substantially. This is graphically depicted in FIG. 5 wherein reduction in perceived noise level is plotted as a function of the ratio of L/D. It is clear that the improvement starts to attenuate rapidly between an L/D of 0.3 and 0.4, and beyond a value of 0.5 the curve is essentially flat. Therefore, the weight-conscious inlet designer would choose a ratio of L/D between essentially 0.3 and 0.5 for optimum noise reduction with minimum duct length and weight.

It should be obvious to one skilled in the art that certain changes can be made to the above-described invention without departing from the broad inventive concepts thereof. For example, as previously mentioned, the subject deflector may be employed on any duct having noise emanating within and not necessarily restricted to gas turbine engine applications. Further, it is contemplated that the subject deflector could be disposed at other than the bottom of the inlet duct and that it could be made axially and circumferentially translatable. It is intended that the appended claims cover these and all similar variations of the present invention's broader inventive concepts.

What I claim is:

1. An inlet duct for selectively reducing noise propagation emanating within said duct and improving inlet pressure recovery, said inlet duct including a circumscribing lip and an upstream deflector means positioned within a first circumferential sector of said inlet duct, said deflector comprising an extension of said lip and projecting axially forward of a second circumferential sector of said duct, the improvement comprising:
   a substantially arcuate axial contour of said lip at said deflector means wherein said contour has at least one point of curvature inflection.

2. The inlet duct of claim 1 wherein said inlet duct is substantially cylindrical.

3. The inlet of claim 1 wherein said first sector is disposed at essentially the bottom of said inlet duct.

4. The inlet duct of claim 1 wherein said inlet duct is adapted for use with a gas turbine engine.

5. The inlet duct of claim 2 wherein:
   D = diameter of the inlet duct;
   L = length of the deflector projection axially forward of the rearward-most projection of said lip; and
   the ratio of L/D is substantially between 0.3 and 0.6.

6. The inlet duct of claim 2 wherein said arcuate contour is substantially sinusoidal.

7. The inlet duct of claim 2 wherein said arcuate contour predominantly comprises a first circular arc and a second circular arc, said arcs tangent to each other and of opposite sense, and further wherein:
   said first arc has a center of curvature axially downstream of the forward-most projection of said lip, and
   said second arc has a center of curvature axially forward of said rearward-most projection of said lip.

8. The inlet duct of claim 7 wherein said first arc is further tangent to the forward-most projection of said lip and said second arc is tangent to said rearward-most projection of said lip.

9. The inlet duct of claim 7 wherein said first and second arcs are contoured to merge with said forward-most and rearward-most projections of said lip, respectively.

10. The inlet duct of claim 7 wherein:
    D = diameter of the inlet duct;
    L = length of the deflector projection axially forward of the rearward-most projection of said lip;
    $R_1$ = radius of curvature of said first circular arc;
    the ratio of L/D is substantially between 0.3 and 0.6; and
    the ratio of $R_1/D$ is substantially between 0.3 and 0.5.

11. The inlet of claim 10 wherein:
    $R_2$ = radius of curvature of said second circular arc; and
    the ratio of $R_2/D$ is substantially between 0.5 and 0.7.

* * * * *